United States Patent
Inuzuka et al.

(10) Patent No.: US 9,534,344 B2
(45) Date of Patent: Jan. 3, 2017

(54) DYEING METHOD AND DYEING APPARATUS

(75) Inventors: Minoru Inuzuka, Hazu-gun (JP); Hiroyasu Ueta, Kakegawa (JP)

(73) Assignees: NIDEK CO., LTD., Gamagori (JP); SHIZUOKA PREFECTURAL GOVERNMENT, Shizuoka (JP)

(*) Notice: Subject to any disclaimer, the term of this patent is extended or adjusted under 35 U.S.C. 154(b) by 134 days.

(21) Appl. No.: 12/933,801

(22) PCT Filed: Mar. 23, 2009

(86) PCT No.: PCT/JP2009/055577
§ 371 (c)(1),
(2), (4) Date: Sep. 21, 2010

(87) PCT Pub. No.: WO2009/122930
PCT Pub. Date: Oct. 8, 2009

(65) Prior Publication Data
US 2011/0018175 A1 Jan. 27, 2011

(30) Foreign Application Priority Data
Mar. 31, 2008 (JP) ................. 2008-089869

(51) Int. Cl.
*D06P 5/20* (2006.01)
*G02C 7/10* (2006.01)
*G02B 5/22* (2006.01)

(52) U.S. Cl.
CPC .............. *D06P 5/20* (2013.01); *D06P 5/2005* (2013.01); *D06P 5/2066* (2013.01); *G02C 7/108* (2013.01); *G02B 5/22* (2013.01); *G02C 2202/16* (2013.01)

(58) Field of Classification Search
CPC ......... D06P 5/20; D06P 5/2005; D06P 5/2066; G02C 7/108; G02C 2202/16; G02C 7/10; G02B 5/22; G02B 5/223
See application file for complete search history.

(Continued)

(56) References Cited

U.S. PATENT DOCUMENTS 3,502,871 A * 3/1970 Collier et al. ................. 430/201
5,560,751 A * 10/1996 Hoshiyama ........................ 8/506

(Continued)

FOREIGN PATENT DOCUMENTS

GB 2083726 A * 3/1982 ............... H04N 1/22
JP A-49-018966 2/1974

(Continued)

OTHER PUBLICATIONS

NPL-1. Grafix Plastics. Mylar Film and Sheet PRoperties. 2007.*

(Continued)

*Primary Examiner* — Yogendra Gupta
*Assistant Examiner* — Leith S Shafi
(74) *Attorney, Agent, or Firm* — Oliff PLC

(57) ABSTRACT

Disclosed is a dyeing method using a laser beam. The method can dye transparent resins such as plastic lens well. Also disclosed is a dyeing apparatus. The dyeing method comprises heating a plastic lens having a dye-coated surface to fix the dye on the surface of the plastic lens. The method comprises the step of applying a laser beam with a wavelength, which is less likely to be absorbed in the dye but it absorbed in the plastic lens, onto the surface of the plastic lens through the dye.

12 Claims, 3 Drawing Sheets

(56) References Cited

U.S. PATENT DOCUMENTS

| | | | |
|---|---|---|---|
| 5,863,860 A * | 1/1999 | Patel | B41M 5/38207 427/146 |
| 5,939,193 A * | 8/1999 | Katsen et al. | 428/411.1 |
| 6,245,397 B1 * | 6/2001 | Watanabe et al. | 427/596 |
| 6,520,999 B1 | 2/2003 | Kamata et al. | |
| 2004/0118157 A1 * | 6/2004 | Borek et al. | 65/30.13 |
| 2004/0265572 A1 * | 12/2004 | Baillet | 428/336 |
| 2005/0061424 A1 * | 3/2005 | Ackerman et al. | 156/245 |
| 2005/0199152 A1 * | 9/2005 | Hale et al. | 101/491 |
| 2007/0241313 A1 * | 10/2007 | Kato | 252/585 |
| 2008/0111877 A1 * | 5/2008 | Heyse et al. | 347/220 |

FOREIGN PATENT DOCUMENTS

| | | |
|---|---|---|
| JP | A-57-133286 | 8/1982 |
| JP | A-59-106589 | 6/1984 |
| JP | A-04-353529 | 12/1992 |
| JP | A-11-048356 | 2/1999 |
| JP | A-2001-59950 | 3/2001 |
| JP | A-2001-159746 | 6/2001 |
| JP | A-2001-215306 | 8/2001 |
| JP | A-2003-041489 | 2/2003 |
| JP | A-2005-273122 | 10/2005 |
| JP | A-2006-249597 | 9/2006 |
| JP | A-2007-016346 | 1/2007 |
| JP | 2008012869 A * | 1/2008 ............ B41M 5/26 |
| JP | A-2008-281729 | 11/2008 |

OTHER PUBLICATIONS

International Search Report issued in Application No. PCT/JP2009/055577; Dated Jun. 23, 2009 (With Translation).
Supplementary European Search Report issued in Application No. 09728217.2; Dated Feb. 4, 2011.

* cited by examiner

DYEING METHOD AND DYEING APPARATUS

CROSS-REFERENCE TO RELATED APPLICATIONS

This is a national phase application filed under 35 U.S.C. 371 of PCT/JP2009/055577 filed on Mar. 23, 2009, which claims the benefit of priority from the prior Japanese Patent Application No. 2008-089869 filed on Mar. 31, 2008, the entire contents of all of which are incorporated herein by reference.

TECHNICAL FIELD

The present invention relates to a dyeing method of dyeing a transparent resin body, especially a plastic lens, by using a laser beam, and a dyeing apparatus adopting the method.

BACKGROUND ART

As a method of dyeing a transparent resin body such as a plastic lens, there has been conventionally known a lens dyeing method achieved by dipping a lens in a dyeing solution for a predetermined time (a dip dyeing method). This method has been heretofore used but has disadvantages such as poor working environments and difficulty in dyeing a high refractive lens and a polycarbonate resin lens (Refractive index (power): 1.59). The polycarbonate resin lens is hard to break and assures high safety. Accordingly, this lens is widely used for spectacles lenses in U.S.A.

To dye the polycarbonate lens, the present inventors proposed a dyeing method achieved by applying (outputting) dyeing inks containing sublimable dyes to a base body such as paper by use of an inkjet printer, placing this base body without contact with a lens under vacuum, thereby ejecting the sublimable dyes toward the lens (hereinafter, referred to as a vapor deposition transfer dyeing method) (e.g., see Patent Literature 1). In this method, the lens is heated in an oven to fix the dye to a lens surface. The vapor deposition transfer dyeing method disclosed in Patent Literature 1 can dye a high refractive lens and a polycarbonate resin lens, which is more advantageous than the dip dyeing method.

On the other hand, there has been known a method of dyeing by previously applying sublimable dyes or inks containing the sublimable dyes to an object to be dyed and then irradiating a laser beam having a wavelength in a visible range to the object to be dyed (see Patent Literature 2).

CITATION LIST

Patent Literature

Patent Literature 1: JP 2001-215306A
Patent Literature 2: JP 2006-249597A

SUMMARY OF INVENTION

Technical Problem

However, the conventional techniques have the following disadvantages.

(1) Recently, a plastic lens of higher refractive index (e.g., refractive index of 1.74 or more) has been proposed. In the case where the vapor deposition transfer dyeing method is performed for dyeing using such high refractive lenses, a heating temperature or a heating time has to be increased for fixation and color-development of the sublimable dyes on the lens. Increasing the heating temperature and the heating time would cause a problem that the lens itself is liable to turn yellow (yellow discoloration). Furthermore, it is desirable to minimum the heating time needed to fix the dyes on the lens to enhance the efficiency of a dyeing process. Herein, the "yellow discoloration" means a phenomenon that a plastic lens is chemically changed to turn yellow. If the entire lens turns yellow, it may cause a problem that the lens is dyed in different color tone.

(2) The dyeing method using laser disclosed in Patent Literature 2 is advantageous because it does not heat the entire object to be dyed. However, the sublimable dyes are heated by irradiation of the laser beam and thus are easy to sublime, which causes a problem that a desired color density could not be obtained.

The present invention has been made to solve the above problems and has a purpose to provide a dyeing method and a dyeing apparatus using a laser beam to appropriately dye transparent resin such as a plastic lens.

Solution to Problem

To solve the above problems, one aspect of the invention provides a dyeing method or a dyeing apparatus having the following configurations.

(1) In a dyeing method of heating a transparent resin body having a surface applied with a dye to fix the dye on the surface of the transparent resin body, the method comprises: a step of irradiating a laser beam having a wavelength less likely to be absorbed by the dye toward the transparent resin body to heat the dye through the transparent resin body and heat the transparent resin body to a temperature that does not melt the surface of the transparent resin body and that causes the heated dye to be dispersed into the transparent resin body.

(2) In a dyeing method of heating a transparent resin body having a surface applied with a dye to fix the dye on the surface of the transparent resin body, the method comprises: a step of irradiating a laser beam having a wavelength absorbable by an absorbent toward the absorbent while the dye and the absorbent for absorbing infrared or ultraviolet light are laminated in this order, to heat the transparent resin body and the dye through the absorbent and heat the transparent resin body at a temperature that does not melt the surface of the transparent resin body and that causes the heated dye to be dispersed into the transparent resin body.

(3) In the dyeing method (1) or (2), preferably, the laser beam is a laser beam having a wavelength that is less likely to be absorbed by the dye but is absorbed by the transparent resin body, and the laser beam is irradiated to the surface of the transparent resin body by passing through the dye.

(4) In one of the dyeing methods (1) to (3), preferably, the laser beam has a wavelength in an infrared region or an ultraviolet region.

(5) In one of the dyeing methods (1) to (4), preferably, the laser beam is spot light or slit light and scans all over the surface of the transparent resin body.

(6) In the dyeing method (5), preferably, the laser beam is irradiated in a line-focused state with respect to an object to be dyed.

(7) In the dyeing method (5), preferably, the laser beam is irradiated in a defocused state by a predetermined distance from the surface of the transparent resin body.

(8) In one of the dyeing methods (1) to (7), preferably, the transparent resin body is a plastic lens having a high refractive index of 1.60 or more.

(9) In a dyeing apparatus for heating a transparent resin body having a surface applied with a dye to fix the dye on the surface of the transparent resin body, the apparatus comprises: a laser irradiation device adapted to irradiate a laser beam having a wavelength less likely to be absorbed by the dye toward the transparent resin body to heat the dye through the transparent resin body and heat the transparent resin body to a temperature that does not melt the surface of the transparent resin body and that causes the heated dye to be dispersed into the transparent resin body.

(10) In a dyeing apparatus for heating a transparent resin body having a surface applied with a dye to fix the dye on the surface of the transparent resin body, the apparatus comprises: a laser irradiation device adapted to irradiate a laser beam having a wavelength absorbable by an absorbent toward the absorbent while the dye and the absorbent for absorbing infrared or ultraviolet light are laminated in this order, to heat the transparent resin body and the dye through the absorbent and heat the transparent resin body at a temperature that does not melt the surface of the transparent resin body and that causes the heated dye to be dispersed into the transparent resin body.

(11) In the dyeing apparatus (9) or (10), preferably, the laser beam is a laser beam having a wavelength that is less likely to be absorbed by the dye but is absorbed by the transparent resin body, and the laser beam is irradiated to the surface of the transparent resin body by passing through the dye.

(12) In one of the dyeing apparatuses (9) to (11), preferably, the laser beam has a wavelength in an infrared region or an ultraviolet region.

(13) In one of the dyeing apparatuses (9) to (12), preferably, the laser beam is spot light or slit light and scans all over the surface of the transparent resin body.

(14) In the dyeing apparatus (13), preferably, the laser beam is irradiated in a line-focused state with respect to an object to be dyed.

(15) In the dyeing apparatus (13), preferably, the laser beam is irradiated in a defocused state by a predetermined distance from the surface of the transparent resin body.

(16) In one of the dyeing apparatuses (9) to (15), preferably, the transparent resin body is a plastic lens having a high refractive index of 1.60 or more.

Advantageous Effects of Invention (1) In the dyeing method of heating a transparent resin body having a surface applied with a dye to fix the dye on the surface of the transparent resin body, the method comprises: a step of irradiating a laser beam having a wavelength less likely to be absorbed by the dye toward the transparent resin body to heat the dye through the transparent resin body and heat the transparent resin body to a temperature that does not melt the surface of the transparent resin body and that causes the heated dye to be dispersed into the transparent resin body. Accordingly, this step loosens a molecular structure of polymer that constitutes resin and disperses a disperse dye in portions of the polymer whose molecular structure has been loosened. Thus, the dye can be fixed on the surface of the transparent resin body. Such fixation is conceived to be caused by compatibility of the disperse dye with the transparent resin body. Furthermore, use of the laser beam can efficiently heat the lens, enabling dyeing in a very short time.

At that time, the surface of the transparent resin body, up to only a depth of about 100 to 200 μm, is heated to a high temperature, and the inside of the transparent resin body is hardly heated. Even when the surface of the transparent resin body turns yellow, the entire transparent resin body does not turn yellow. Accordingly, after the transparent resin body is dyed, the color tone of dyeing is not changed. Furthermore, the dye hardly absorbs the laser beam and hence is not heated and not sublimated. The dyeing density remains unchanged.

(2) The laser beam having a wavelength that is less likely to be absorbed by the dye but is absorbed by the transparent resin body is used to irradiate the surface of the transparent resin body by passing through the dye. Accordingly, the dye is not directly heated. This prevents the dye from subliming in air.

(3) The laser beam has a wavelength in an infrared region or an ultraviolet region. Dyes generally have a property of absorbing light in a visible region and less absorbing light in a infrared or ultraviolet wavelength region. Thus, the laser beam can heat only the surface of the plastic lens without heating the dye.

(4) The laser beam is spot or slit light and scans the surface of the transparent resin body. Accordingly, the entire surface of the plastic lens can be uniformly and promptly heated.

(5) The laser beam is irradiated in a line-focused state with respect to the plastic lens, Accordingly, the surface of the plastic lens can be efficiently heated by simple scanning of the line.

(6) Furthermore, the laser beam is irradiated in a defocused state by a predetermined distance from the surface of the plastic lens. Accordingly, the laser beam is dispersed, enabling more uniform heating of the surface of the plastic lens.

(7) Defocusing is carried out to bring a focus point of the laser beam to a light source side relative to the surface of the transparent resin body. The defocusing can be easily achieved.

(8) Furthermore, the dyeing method and the dyeing apparatus of the invention are effective as a method of dyeing a plastic lens as the transparent resin body, the plastic lens particularly having a high refractive index of 1.60 or more, more preferably 1.74 or more. When the conventional dyeing method including heating in an oven is used to heat the plastic lens having a high refractive index of 1.60 or more, the lens being made of for example thiourethane resin or thioepoxy resin, it is necessary to heat the entire lens at a temperature of 140° C. or higher. This causes a problem with yellow discoloration caused by the heating temperature and the heating time.

According to the dyeing method and the dyeing apparatus of the invention, on the other hand, only the surface of the plastic lens can be heated by the laser beam. The molecular structure of polymer constituting the resin is loosened at a small heat quantity, thereby allowing the dye to combine with the molecular structure of the polymer. This makes it possible to bring the dye in tight contact with the surface of the transparent resin body. In other words, the entire plastic lens is not heated to a high temperature and thus an area that will turn yellow is small. The entire plastic lens is therefore dyed without changing the color tone.

REFERENCE SIGNS LIST

Figure 1:
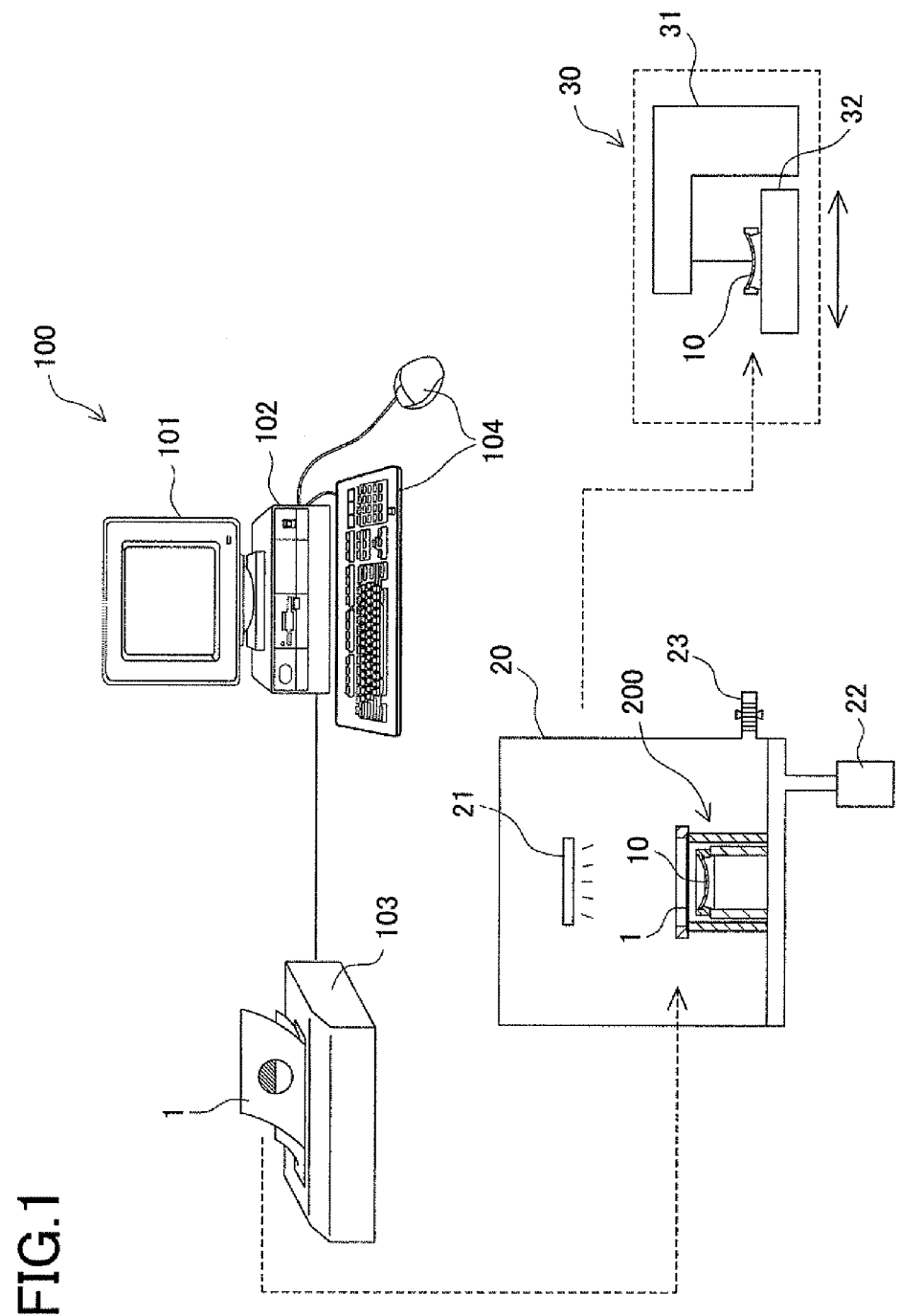
FIG. 1 is a view showing an entire configuration of a dyeing system.

10 Plastic lens
30 Dyeing apparatus
33 Laser source
35 Beam expander
36 Reflection mirror
37 Cylindrical lens
32 XY movable stage
38 Drive mechanism
39 Controller
40 Control section

DESCRIPTION OF EMBODIMENTS

A detailed description of a preferred embodiment of the present invention will now be given referring to the accompanying drawings.

Figure 2:
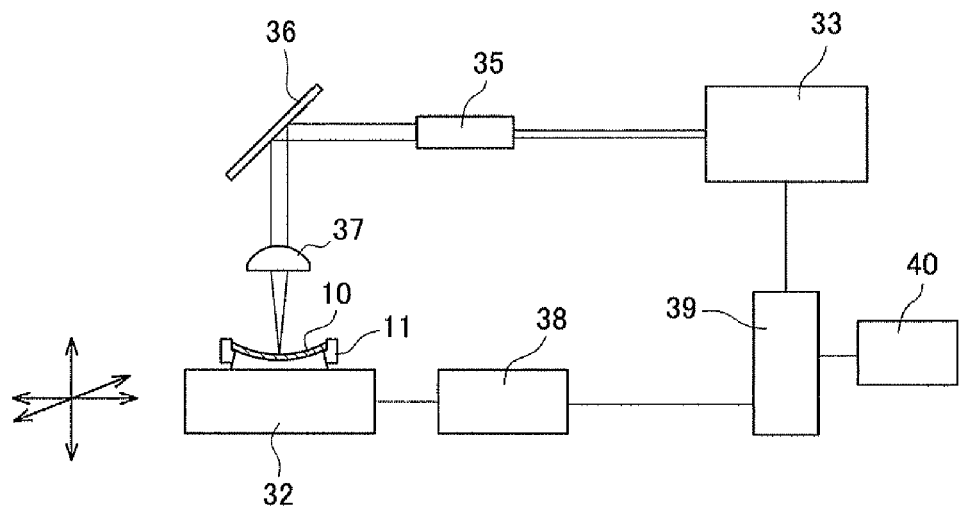
FIG. 2 is a view showing a configuration of a dyeing apparatus in one aspect of the invention.

FIG. 1 is a schematic view of a dyeing system to be used in a dyeing method using a laser beam in one aspect of the invention. FIG. 2 is a view showing a schematic configuration of a dyeing apparatus.

The dyeing system includes a base body producing device 100 for producing a dyeing base body for dyeing, a vacuum vapor deposition transfer machine 20 for depositing (transferring) sublimable dyes applied to the dyeing base body on a plastic lens 10 which is a transparent resin body (a plastic lens is used as the transparent resin body in this embodiment), and a dyeing apparatus 30 for performing dyeing by irradiating a laser beam to the plastic lens 10 on which the sublimable dyes have been deposited.

The dyeing base body producing device 100 includes a monitor 101, a personal computer (hereinafter, referred to as PC) 102, an inkjet printer 103, and others. Numeral 104 is an operation unit for operating the PC, such as a keyboard, a mouse, etc. The PC 102 is used to execute a dyeing base body producing program stored in a hard disk to output a dyeing base body 1 from the inkjet printer 103. The hard disk of the PC 102 has stored in advance a program of the dyeing base body producing software to produce a dyeing base body to be used for dyeing a plastic lens, and further various information of base materials of the plastic lens, color data of dyeing inks to be applied on a base body, and others.

The dyeing base body 1 is produced by applying (outputting) dyeing inks in a predetermined shape on a medium such as paper usable in the inkjet printer 103. The medium used herein has a back side (a surface to be unprinted) entirely colored in black to increase heat absorption efficiency of the dyeing base body 1.

The dyeing inks used in the inkjet printer 103 include at least three color inks, red, blue, and yellow. The dye contained in each dyeing ink needs to be sublimable and resistant to heat during sublimation. It is further necessary to dye the plastic lens 10 without irregular coloring when the dyes are deposited on the plastic lens 10 and then the color-developing work is conducted to fix the dyes on the plastic lens 10. In considering the above features, preferable dyes to be used are a quinophthalone sublimable dye or an anthraquinone sublimable dye.

The vacuum vapor deposition transfer machine 20 shown in FIG. 1 is provided with a door not shown to be open and closed for taking in and out the plastic lens 10, the dyeing base body 1, and others. On an upper part of the vacuum vapor deposition transfer machine 20, a heating lamp 21 is placed as a heating source to heat the dyeing base body 1, thereby sublimating the dyes. The heating lamp 21 used in this embodiment is a halogen lamp, but may be any type if only it can heat the dyeing base body 1 without contact therewith. On a bottom of the vacuum vapor deposition transfer machine 20, a dyeing jig 200 is placed. The plastic lens 10 and the dyeing base body 1 are set in this dyeing jig 200. Numeral 22 is a rotary pump to be used for creating an almost vacuum in the vacuum vapor deposition transfer machine 20. Numeral 23 is a leak valve, which is opened to take outside air into the vacuum vapor deposition transfer machine 20 whose inside is in an almost vacuum state for returning the inside to atmospheric pressure. The dyeing jig 200 supports the lens 10 (a surface to be dyed) and the dyeing base body 1 (an ink applied surface) so that they face each other in noncontact relation.

The material of the plastic lens 10 used herein is selectable from polycarbonate resin (e.g., diethylene glycol bisallyl carbonate polymer (CR-39)), polyurethane resin, allyl resin (e.g., allyl diglycol carbonate and its copolymer, diallyl phthalate and its copolymer), fumaric acid resin (e.g., benzyl fumarate copolymer), styrene resin, polymethyl acrylate resin, fibrous resin (e.g., cellulose propionate), high refractive materials such as thiourethane resin (MR-7, MR-8) and thioepoxy resin, and other high refractive materials that have been heretofore considered inferior in dyeability.

The dyeing apparatus 30 is configured to irradiate the laser beam to the plastic lens 10 applied with the sublimable dyes by the vacuum vapor deposition transfer machine 20 to heat the lens 10, thereby fixing and color-developing the dyes.

FIG. 2 is a schematic view showing a configuration of the dyeing apparatus 30.

The dyeing apparatus 30 includes a laser source 33 that emits a laser beam having a predetermined wavelength, a beam expander 35 for expanding the beam diameter of the laser beam, a reflection mirror 36, a cylindrical lens 37, an XY movable stage 32, a drive mechanism 38, a controller 39, a control part 40, and others.

The laser source 33 emits a laser beam having a wavelength in an infrared region. This embodiment uses a light source that emits a $CO_2$ laser beam having a wavelength of 10.2 to 10.8 µm, but may be any light sources if only it emits a laser beam having a wavelength in an infrared region absorbable by a base material of the plastic lens 10 or a wavelength in an ultraviolet region (including near-ultraviolet region). In this case, the dyes and an absorbent (an absorbent capable of absorbing a wavelength of the laser beam to be irradiated) are laminated in this order. Then, the laser beam is irradiated to the absorbent to heat the same. By heating this absorbent to indirectly heat the base material and the dyes, the dyes can be fixed on the base material.

The laser beam emitted from the laser source 33 is expanded in beam diameter by the beam expander 35, deflected by the reflection mirror 36, and then line-focused on a predetermined position by the cylindrical lens 37. In this embodiment, the laser beam having a diameter of 2.2 mm is emitted from the laser source. This laser beam is expanded five times to 11.0 mm by the beam expander. Thus, a line laser beam having a length of 11.0 mm is irradiated by the cylindrical lens. The length of the laser beam is not limited thereto but may be preferably at least 1 mm or more, and more preferably 5 mm or more.

In a position on which the laser beam will be line-focused, the movable stage 32 is placed so as to be movable up, down, forward, backward, leftward, and rightward. This stage 32 is moved by activation of the drive mechanism 38. Drive control of the drive mechanism 38 is conducted by the controller 39. Control information thereof (a moving direction and a moving speed) is set by the control part 40. A holder 11 is placed on the movable stage 32. The plastic lens 10 on which the sublimable dyes are deposited is put on the holder 11 so that a deposition surface (a surface to be dyed) of the lens 10 faces upward. The control part 40 can be used to set power of the laser beam.

In this embodiment, the sublimable dyes are not heated by the laser beam. The laser beam is irradiated to heat the base material to such an extent as not to melt the surface of the base material (the plastic lens 10), thereby loosening a molecular structure of polymer to allow the dyes to easily permeate therein. By compatibility of the sublimable dyes with the base material, the sublimable dyes are taken and fixed in the base material. In this embodiment, the extent that does not melt the surface of the base material is defined as a state where the surface of the transparent resin body subjected to laser irradiation is not made so rough and whitened as to cause irregular reflection. If a plastic lens is taken as an example, concretely, it is defined as a state that does not cause optical influences such as an image visible through the lens is distorted, and a lens curvature changes, causing a change lens power beyond a permissible range.

Accordingly, power of the laser beam, i.e., irradiation energy density per unit area to the surface to be dyed by the laser beam is determined to achieve a temperature that does not melt the plastic lens and that is needed to loosen the molecular structure of the polymer constituting the base material. Such irradiation energy density can be controlled by adjustment of the power of the laser beam to be emitted from the laser source 33 by the control part 40 and besides by scanning speed or defocusing of the laser beam with respect to the plastic lens.

In this embodiment, the laser beam is not moved for scan but the lens is moved to relatively scan the laser beam over the surface to be dyed. As an alternative, the laser beam may be moved for scan. Instead of the line-focus using the cylindrical lens, the laser beam may be irradiated simply as a spot beam to the lens and scan the same. In this case, the spot diameter is also preferably 1 mm or more.

The following explanation is given to operations of the dyeing method of the plastic lens 10.

As shown in FIG. 2, the plastic lens 10 whose surface is applied with the sublimable dyes is put on the holder 11 so that the surface applied with the sublimable dyes faces upward. Then, a $CO_2$ laser beam is irradiated to the dye applied surface of the plastic lens 10. The power of the $CO_2$ laser beam is too strong. Accordingly, the laser beam is line-focused by using the beam expander 35 and the cylindrical lens 37. Furthermore, the focus point of the line-focused beam is defocused from the dye applied surface of the plastic lens 10.

The line beam irradiated is so wide as to provide low light density.

Figure 3:
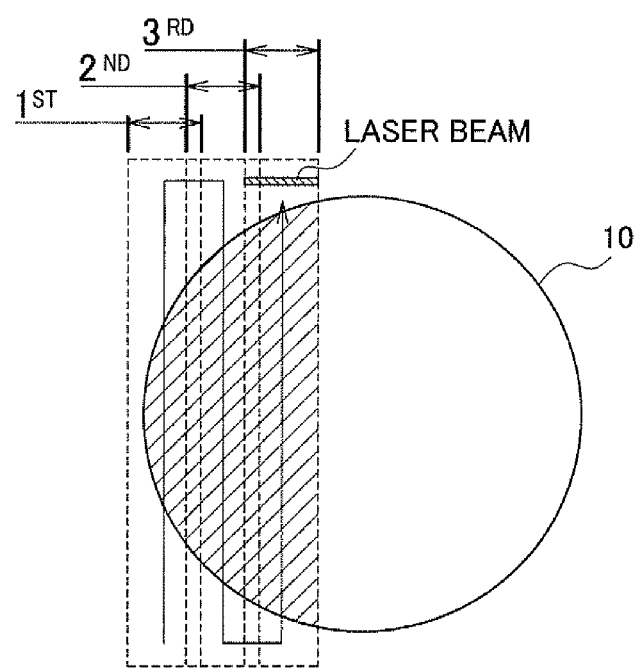
FIG. 3 is a view to explain a laser beam irradiation method.

FIG. 3 shows a scanning manner of the laser beam. The plastic lens 10 is of a diameter of about 100 mm and different thicknesses at different portions, i.e., a thickness of 2 mm at a thin portion and a thickness of 8 mm at a thick portion. The surface of the plastic lens 10 is applied with the sublimable dyes. In this embodiment, the movable stage is moved in XY (back, forth, right, and left) directions so as to perform first scan, turn back for second scan, and then further turn back for third scan as shown in FIG. 3. The second scan is shifted by 2 mm from the first scan in a lateral direction, so that the first scan and the second scan overlap by 9 mm. The same applies to subsequent scans. Each scan is conducted to cover the entire area of the plastic lens 10.

If the length of the laser beam irradiated to the lens surface is set to be equal to or larger than the lens diameter, the dyeing can also be completed by single scan. The scanning speed is not uniformly determined. In this embodiment, however, it is necessary to set the scanning speed to achieve the temperature that does not melt the plastic lens 10 and that is needed to loosen the molecular structure of polymer constituting the base material of the plastic lens 10. For that matter, it is necessary to set the scanning speed needed for the plastic lens 10 to maintain such temperature. Another alternative is to quickly scan the laser beam for repeatedly scanning over the entire lens surface to be dyed, so that the temperature of the entire lens surface is kept at the above temperature.

The laser source 33 is a $CO_2$ laser having a wavelength of 10.2 to 10.8 μm. This wavelength corresponds to infrared light. The sublimable dyes hardly absorb this wavelength light. As the material of the plastic lens 10, this embodiment uses high refractive materials such as a thiourethane material and a thioepoxy material. The material of the plastic lens 10 used in this embodiment absorbs about 50 to 90% of the wavelength of 10.2 to 10.8 μm.

The $CO_2$ laser beam is less likely to be absorbed by the dye but is absorbed by the plastic lens 10. Accordingly, only the surface of the plastic lens 10 is heated to loosen the molecular structure of polymer that constitutes resin, thereby dispersing the sublimable disperse dyes into the portions in which the molecular structure of polymer is loosened. This can fix the disperse dye on the surface of the plastic lens 10. Such dyeing by fixation of the disperse dye is considered to be achieved by compatibility of the disperse dye with the material of the plastic lens 10.

When pigments (dyes) are dispersed from the surface to the inside of the plastic lens 10, the pigments stay in the plastic lens 10 without coming off even when washed. This phenomenon is dyeing.

Dyes are color materials (pigments or coloring matters) having a fixing force with respect to the plastic lens 10 and others. Furthermore, dyeing is basically a phenomenon based on the compatibility between molecules of the dyes and molecules of the plastic lens 10.

Herein, the compatibility is a force based on electrical positive and negative attraction forces of molecules and an attraction force between molecules. The compatibility is based physical binding forces such as an orientation force, an induction force, a dispersion force, and a hydrogen bonding force.

In this embodiment, only the surface portion of the plastic lens 10 is heated to a high temperature. When the plastic lens 10 after dyeing was cut and measured, it was found that the dyes permeated up to a depth of about 20 μm.

At that time, the inside of the plastic lens 10 is hardly heated. Even when the surface layer (a thickness of about 100 μm) of the plastic lens 10 turns yellow, the entire plastic lens 10 (a thickness of 2 to 8 mm) does not turns yellow. When the plastic lens 10 is dyed, the dyeing color tone remains unchanged. The dyes hardly absorb the laser beam and thus are not heated and sublimated. Thus, the dyeing density remains unchanged.

The dyeing method and the dyeing apparatus according to the present invention are especially appropriate for dyeing a plastic lens formed of a transparent resin body having a high refractive index of 1.60 or more. The conventional dyeing method using oven heating could not dye a plastic lens having a refractive index of 1.60 or more made of for example thiourethane resin or thioepoxy resin. Unless such lens is heated at 140° C. or higher for 2 hours or longer, it could not be dyed in sufficient density. When consideration is given to workability, the dyeing has to be conducted in a short time. A higher temperature of 150° C. or more enables short time dyeing. However, the lens is liable to turn yellow or deformed. To apply the dyes to the lens surface, this embodiment adopts the method of depositing the dyes on the lens by heating the sublimable dyes under vacuum but is not limited thereto. For example, an alternative is to sublimate the sublimable dyes under atmospheric pressure, depositing the dyes on the lens surface. Another alternative is to apply the dyes to the lens surface by a spin coat method.

A concrete example is explained below.

Example 1

1. Test Conditions (1) Application of Dyes to a Plastic Lens Surface: Vapor Deposition Transfer Method
(1-1) Equipment Used:
Printer: EPSON MJ-8000C
Inks: Nidek, TTS INK RED NK-1
  Nidek, TTS INK YELLOW NK-1
  Nidek, TTS INK BLUE NK-1
Printing software: Nidek, TTS-PS1.0
Vapor deposition transfer device: TTM-1000
(1-2) Printing
Printing was made on paper for transfer with data in Table 1 (Yellow, Red, Blue, and Brown) by use of MJ-8000C.

TABLE 1

|  | Yellow INK | Red INK | Blue INK |
| --- | --- | --- | --- |
| Yellow 1 | 1024 | 0 | 0 |
| Red 1 | 0 | 1024 | 0 |
| Blue 1 | 0 | 0 | 1024 |
| MIX 1 | 256 | 256 | 256 |

Maximum print amount is 1024 and Half print amount is 512.

(1-3) Vapor Deposition Transfer
The printed transfer paper and a MR8 lens (S-2.50) were set in a jig and then put in TTM-1000. The transfer work was conducted under the conditions that: the degree of vacuum was 0.5 kPa, the temperature of the transfer paper was 225° C., and the refractive index of the MR8 lens was 1.60.
(1-4) Laser Irradiation Test
Experimental equipment:
Laser: Synrad Inc., t100A 100 W
Power of Laser beam: 15 W
Diameter of Laser beam emerging from DP: 2.2 mm
Beam expander magnification: Five times
Output beam diameter: 11.0 mm
Defocusing: 50 mm
Scanning speed: 10 mm/s
Experiment method: A lens applied with the dyes was set on the stage and irradiated with a laser beam by moving the stage.

2. Test Results

Evaluation was made about coloring of color, damage of a base material surface, and solid-state properties of a coated film.
(1) Coloring of Color
After completion of laser beam irradiation, the lenses were wiped with a cloth saturated with acetone. It was checked whether or not each lens was colored. Each lens was dyed in each color with desired density.
(2) Damage of the Base Material Surface
After each lens was covered with a current hard coat and an antireflection coat applicable to spectacle lenses, the surface reflection was checked whether or not damages (irregularity caused by melting of base materials) were found in irradiated portions. As a result of checking the lens surfaces dyed in each color, no damage was found.
(3) Solid-State Physical Properties of Films
Since there is a fear of the influence of the laser beam on adhesion strength between the hard coat and the base material, a peeling test was conducted by making slits in a grid pattern with a cutter knife according to a cross-cut adhesion test JIS K5400 and a cross-cut adhesion tape test, and using an adhesive cellophane tape made by Nichiban Co., Ltd.

As a result, no peeling was found and any films had no problem.

Example 2

A CR-39 lens was tested under the conditions that Power of the laser beam of 20 W, Defocusing of 50 mm, and Scanning speed of 40 mm/s.

As a result of the test, no problem was found in each color.

Example 3

A lens having a refractive index of 1.74 was tested under the conditions that the power of the laser beam was 15 W, the defocusing was 50 mm, and the scanning speed was 10 mm/s.

As a result of the test, no problem was found in each color.

Example 4

In Example 4, it was studied whether or not dyeing using an infrared absorbent could be achieved.

A base material formed of a polycarbonate flat plate (t=1) was subjected to dyeing by the same method and under the same conditions as those in the above embodiment. The absorbent (KP Deeper NR paste: Nippon Kayaku Co., Ltd.) was melted in acetone and then applied to the paper for vapor deposition transfer. Subsequently, by use of the paper applied with the absorbent, the absorbent was laminated on the flat plate applied with the dye by the vapor deposition transfer.

The laser apparatus (a fiber coupling type high power semiconductor laser: 45 W, 808 nm in wavelength) made by JENOPTIK LASERDIODE GmbH and a condenser lens (f=30 mm) were used. A distance from a lower surface of the lens to a surface of the base material was set at about 38 mm. Infrared laser beam was irradiated to the base material (the absorbent) through the condenser lens. Input electric current at that time was about 10 A (about 2 w). A test results in no problem in each color.

Conclusion

In the vapor deposition transfer, the dyeing is usually fixed (dyed) by use of an oven. However, it was found that the $CO_2$ laser beam enabled coloring in a short time. If irradiation power of the $CO_2$ laser beam is too strong, the base material is damaged. If it is too weak, some portions are not colored.

The above dyeing could be achieved irrespective of colors (dyes). However, it seems necessary to change the conditions according to the base materials.

Next, Example 5 and Comparative example 1 are described below to compare dyeing of a transparent resin body using a laser beam in the above embodiment and dyeing of a transparent resin body using an oven.

Example 5

In Example 5, two kinds of MR8 lenses made by different manufactures were prepared as the transparent resin bodies (1.60 SP NC S-2.00 made by CHMIGLAS Corp. and 160 ASP NC S-2.00 made by SOMO Optical Co., Ltd.). These two kinds of plastic lenses were subjected to dyeing using the same base materials and inks (red, yellow, and blue) as those in Example 1 to dye each lens surface by a vapor deposition transfer method. Print data of each color ink to be output on transfer paper was Red, Yellow, and Blue=170, 100, 320. The vapor deposition transfer conditions were the degree of vacuum of 0.2 kPa and the temperature of transfer paper of 225° C. Laser irradiation for dye fixation was carried out by using a $CO_2$ laser GEM30A made by COHERENT Co., Ltd. under the conditions that the power of laser beam was 21.4 W, the defocusing was 240 mm, and the scanning speed was 12.4 mm/s.

Figure 4:
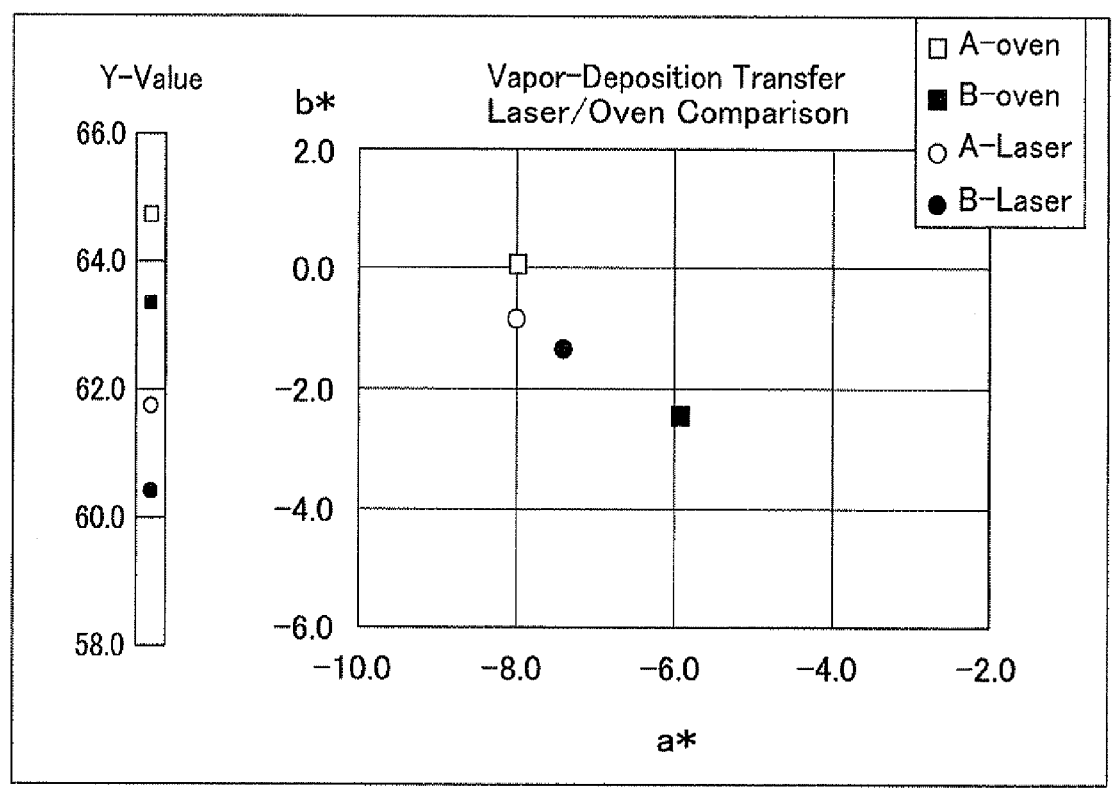
FIG. 4 is a view showing comparison between dyeing using laser and dyeing using oven heating.

Each dyed plastic lens was wiped with a cloth saturated with acetone and then subjected to measurement of a dyed state using DOT-3: D65-10 made by Murakami Color Research Laboratory Co., Ltd. A result thereof is shown in Table 2. A MRS lens made by CHMIGLAS Corp. subjected to laser dyeing is expressed as A-Laser and a MRS lens made by SOMO Optical Co., Ltd. is expressed as B-Laser. Obtained measurement results are plotted in FIG. 4.

Comparative Example 1

Two kinds of MR-8 lenses identical to those in Example 5 were used. Each lens surface was applied with dyes under the same conditions as those in Example 5. For fixation, each plastic lens applied with the dyes was put in an oven (DKN612 made by YAMATO SCIENTIFIC Co., Ltd.) and heated at 150° C. for 1 hour. The heated plastic lens was wiped with a cloth saturated with acetone and then subjected to the same measurement as in Example 5. A result thereof is shown in Table 2. Of the MR8 lenses subjected to dyeing using the oven, one lens made by CHMIGLAS Corp. is expressed as A-Oven and the other lens made by SOMO Optical Co., Ltd. is expressed as B-Oven. Obtained measurement results are plotted in FIG. 4.

TABLE 2

| Lens No. | Lens | Fixing method | L* | a* | b* | Y |
|---|---|---|---|---|---|---|
| A-Oven | CHEMIGLAS Corp. | Oven | 84.346 | −7.987 | 0.069 | 64.734 |
| B-Oven | SOMO Optical Co., Ltd. | Oven | 83.629 | −5.919 | −2.482 | 63.355 |
| A-Laser | CHEMIGLAS Corp. | Laser | 82.779 | −7.991 | −0.823 | 61.748 |
| B-Laser | SOMO Optical Co., Ltd. | Laser | 82.066 | −7.401 | −1.361 | 60.420 |

Conclusion

In general, even lenses made of the same materials have different polymerization degrees due to respective manufacturing processes and others according to different manufacturers. Thus, obtained lenses are likely to have different dyeing properties. As shown in Example 5 and Comparative example 1, two kinds of lenses made of the same materials but by different manufactures are compared in terms of dyeing using the oven and dyeing using laser fixation. The two kinds of lenses provided by the laser fixing and dyeing have a smaller difference in color therebetween than the two kinds of lenses provided by the oven dyeing. This result shows superiority of the present invention. In terms of Y value (Luminous transmittance), the lenses dyed using the oven were lower than the lenses dyed using the laser even through the same dyes were applied. This is because the applied dyes were sublimated again in the oven before the dyes were dispersed in the base material. Accordingly, the lenses dyed in the oven are more different in color from each other.

The present invention is not limited to the above embodiments and may be embodied in other specific forms without departing from the essential characteristics thereof.

For example, the above embodiment uses the $CO_2$ laser beam but may use a semiconductor laser or the like.

The above embodiment adopts the vapor deposition transfer method to apply the dyes on the surface of the plastic lens 10 but may adopt another application method.

The invention claimed is:

1. A dyeing method of heating a transparent resin body having a surface applied with a sublimable dye to fix the sublimable dye on the surface of the transparent resin body, the method comprising:
   irradiating a laser beam to the transparent resin body with the sublimable dye applied on the surface of the transparent resin body by scanning the laser beam over the dye applied surface of the transparent resin body, wherein: (i) the laser beam has a wavelength in an infrared region or an ultraviolet region that is not substantially absorbed by the sublimable dye and is substantially absorbed by the transparent resin body; (ii) the laser beam is passed through the dye so that the laser beam heats the surface of the transparent resin body to a temperature that does not melt the surface of the transparent resin body; and (iii) the heated transparent resin body heats the sublimable dye and causes it to be dispersed into the transparent resin body, wherein the sublimable dye is not sublimated from the dye absorbing the laser beam.

2. A dyeing method of heating a transparent resin body having a surface applied with a sublimable dye to fix the sublimable dye on the surface of the transparent resin body, the method comprising:

irradiating a transparent resin body having an absorbent with a laser beam having a wavelength in an infrared region or an ultraviolet region, by scanning the laser beam over the transparent resin body, on the surface of the transparent resin body is at least the sublimable dye and the absorbent, the absorbent absorbing light at the wavelength, and thereby the transparent resin body and the sublimable dye are heated through the absorbent at a temperature that does not melt the surface of the transparent resin body and that causes the heated sublimable dye to be dispersed into the transparent resin body, wherein the sublimable dye is not sublimated from the dye absorbing the laser beam and the sublimable dye does not substantially absorb the laser beam.

3. The dyeing method according to claim 1, wherein the laser beam is spot light or slit light and scans all over the surface of the transparent resin body.

4. The dyeing method according to claim 3, wherein the laser beam is in a line-focused state with respect to an object to be dyed.

5. The dyeing method according to claim 3, wherein the laser beam is in a defocused state by a predetermined distance from the surface of the transparent resin body.

6. The dyeing method according to claim 1, wherein the transparent resin body is a plastic lens having a high refractive index of 1.60 or more.

7. The dyeing method according to claim 1, wherein the transparent resin body is heated to a depth ranging from about 100 µm to 200 µm from the surface of the transparent resin body.

8. The dyeing method according to claim 1, wherein the irradiation does not turn the entire resin body yellow.

9. The dyeing method according to claim 1, wherein the method further comprises transferring the sublimable dye to the surface of the transparent resin body to apply the sublimable dye to the surface of the transparent resin body.

10. The dyeing method according to claim 9, wherein the heated transparent resin body causes substantially all the sublimable dye to be dispersed into the transparent resin body.

11. The dyeing method according to claim 2, wherein the method further comprises transferring the sublimable dye to the surface of the transparent resin body to apply the sublimable dye to the surface of the transparent resin body.

12. The dyeing method according to claim 11, wherein the heated transparent resin body causes substantially all the sublimable dye to be dispersed into the transparent resin body.

* * * * *